UNITED STATES PATENT OFFICE.

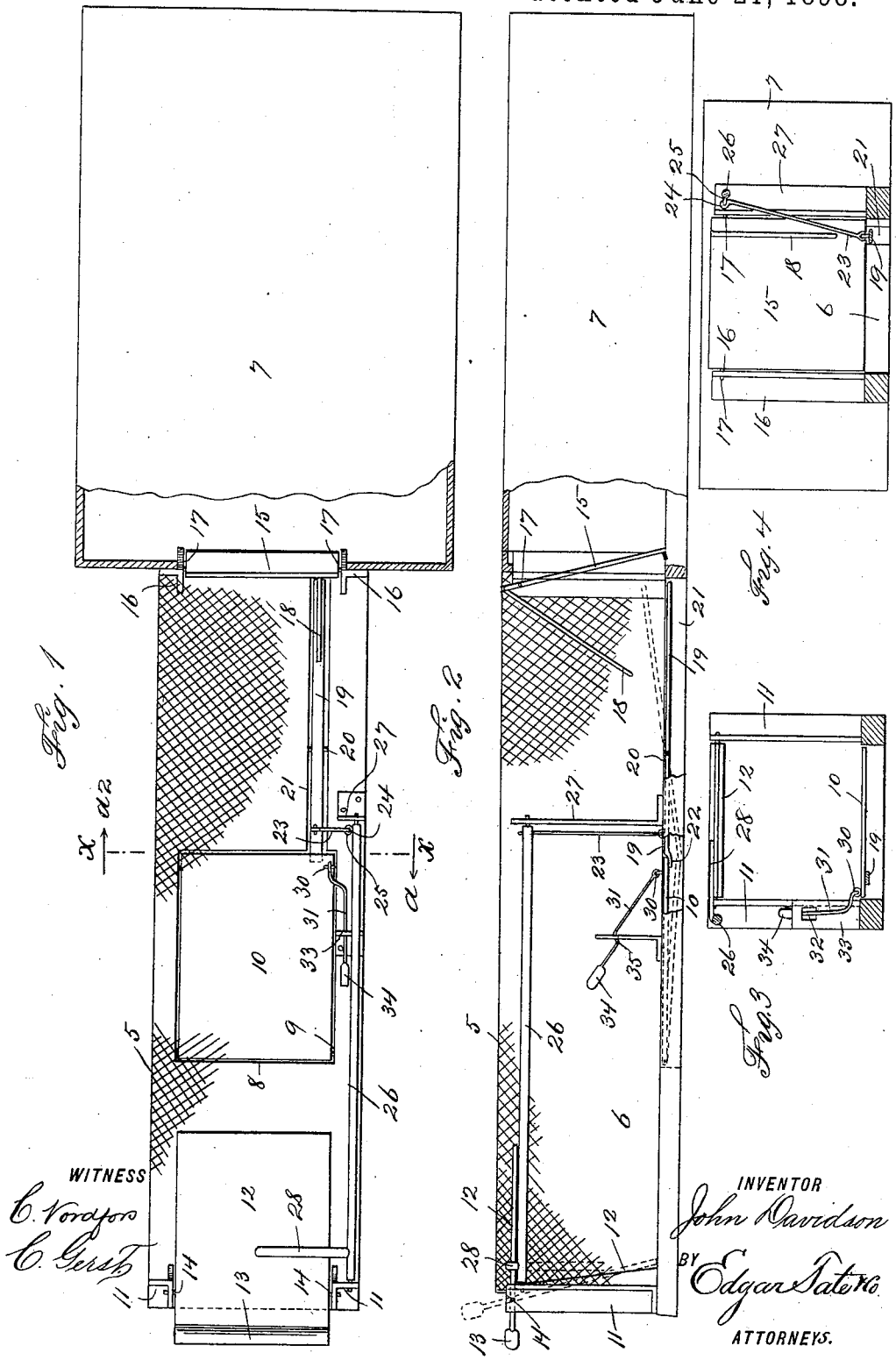

JOHN DAVIDSON, OF HOLKHAM, ENGLAND.

ANIMAL-TRAP.

SPECIFICATION forming part of Letters Patent No. 606,052, dated June 21, 1898.

Application filed October 5, 1897. Serial No. 654,138. (No model.)

*To all whom it may concern:*

Be it known that I, JOHN DAVIDSON, a subject of the Queen of Great Britain, residing at Holkham, in the county of Norfolk, England, have invented certain new and useful Improvements in Animal-Traps, of which the following is a full and complete specification, such as will enable those skilled in the art to which it appertains to make and use the same.

This invention relates to animal-traps; and the object thereof is to provide an improved self-setting trap of this class which is adapted for use in catching rats and other animals; and with this and other objects in view the invention consists in the construction, combination, and arrangement of parts hereinafter described and claimed.

The invention is fully disclosed in the following specification, of which the accompanying drawings form a part, in which—

Figure 1 is a plan view of my improved trap, part of the construction being shown in section; Fig. 2, a side view thereof with part of the construction in section; Fig. 3, a section on the line X X of Fig. 1 looking in the direction of the arrow $a$, and Fig. 4 a section on the same line looking in the direction of the arrow $a^2$.

In the drawings forming part of this specification the separate parts of my improvement are designated by the same numerals of reference in each of the views, and in the practice of my invention I provide a main oblong cage 5, the top and sides of which are composed of wire mesh or similar material, and the bottom thereof being preferably composed of a plate or board 6, and connected with one end of said cage is a box 7, which may be composed of any desired material, said box being preferably much larger in cross-section than the main oblong cage, with which it is connected.

The bottom or floor 6 of the cage 5 is preferably rectangular in form, and is preferably composed of wood; but other material may be employed, and in the center thereof is a rectangular opening 8, in which is pivoted at 9 a rectangular drop-table 10, the pivotal support of said table being near the end thereof opposite the box 7. Two standards or posts 11 are placed at the outer end corners of the cage 5, to the tops of which is pivoted a door 12, which is preferably composed of zinc or similar material and projected above its pivotal support and weighted, as shown at 13, the pivotal supports of said door being shown at 14, and at the inner end of the cage and adapted to close a corresponding opening into the box 7 is a drop-door 15, which is pivoted to crank-posts 16, as shown at 17, and to the upper portion of which is secured an arm 18, which projects outwardly.

A lever 19 is pivoted at 20 in a longitudinal slot 21, formed in one side of the inner end of the bottom 6 of the cage 5, and this slot communicates with the rectangular opening 8 in the bottom 6, which is formed in the middle of said cage, and one end of said lever 19 projects slightly into said rectangular opening 8 and is adapted to support the corresponding end of the table 10, as clearly shown at 22, and pivotally connected with the lever 19 adjacent to the table 10 is a rod 23, which extends upwardly and is connected at 24 with a link or eye 25, rigidly secured or formed on an arm 29 of a horizontal rod 26, which is revolubly mounted in a vertical standard 27 and one of the end standards 11 at the outer end of the cage 5, and said rod 26 is provided near its outer end with a transverse arm 28, which projects transversely from the top of the cage 5 and over the drop-door 12 at the outer end of said cage when said door is held in a horizontal position.

Pivotally connected with the drop-table 10 near the corner thereof adjacent to the end of the pivoted lever 19, as shown at 30, is a curved rod 31, which passes through a slot 32, formed in a vertical standard 33, secured to the bottom or floor 6 of the cage adjacent to the side of the rectangular opening 8, in which the drop-door 10 is pivoted, and the said rod is provided at its free end with a weight 34 and a downwardly-directed loop or bend 35 where it passes through the slot 32. The box 7 may also be composed of wire-gauze or similar material, if desired, and the operation will be readily understood from the foregoing description when taken in connection with the accompanying drawings and the following statement thereof.

The normal position of the drop-door 15, which controls the entrance into the box 7, is shown in Fig. 1, in which it projects downwardly and inwardly into the box 7, and the normal position of the drop-door 12, which controls the entrance to the cage 5, is that shown in Figs. 1 and 2, in which it is raised to a horizontal position and held in said position by the weight 13 and the arm 29 of the rod 26.

In practice the food or bait is placed in the inner end of the cage 5, and the animal attracted by the bait will pass into the trap beneath the drop-door 12 and onto the table 10, which is held in its horizontal or normal position by means of the rod 31, the bend 35 of which rests on the bottom of the slot 32 in the standard 33. As soon as the animal steps on the inner end of the table 10 the weight thus applied thereto causes the rod 31 to slip downwardly through the slot 32 in the standard 33, and the table 10 or the inner end thereof instantly drops and depresses the corresponding end of the lever 19, which projects beneath it, and this operation raises the inner end of said lever, as shown in dotted lines in Fig. 2. The rod 23, which is pivotally connected with the lever 19 near the outer end thereof, is also at the same time caused to turn in its connection at 24 with the rod 26, and said rod 26 is turned inwardly and downwardly and the arm 28 thereof forces the inner end of the drop-door 12 at the entrance of the cage 5 downwardly, as shown in dotted lines in Fig. 2, and closes the entrance to said cage, and this effectually cuts off the retreat of the animal. The animal seeking for a place of escape from the cage passes inwardly beneath the drop-door 15 into the box 7, and this operation raises said door 15 or moves it inwardly and depresses the arm 18, which strikes the raised end of the lever 19, and this raises the outer end of said lever and returns the table 10, the rod 31, and the revolubly-mounted rod 26 to their original position, and the drop-door 12, by means of the weight 13, is raised into the position shown in Figs. 1 and 2, and the separate parts of the trap are then again in position for use.

It will thus be seen that the operation of the trap is entirely automatic, and it will be apparent that the box 7 may be of any desired size, and a number of animals may be caught therein without any attention being given to the trap.

My improved trap is simple in construction and operation, and it will be apparent that changes in and modifications of the construction herein described may be made without departing from the spirit of my invention or sacrificing its advantages.

Having fully described my invention, I claim as new and desire to secure by Letters Patent—

1. An animal-trap comprising a main oblong box or cage which is in communication at one end with a supplemental box or cage, a weighted drop-door normally held open at its outer end, a drop-door 15 normally closed at the other end, a revoluble rod pivotally mounted at one side of said first-mentioned door having an arm projecting over said door and connections between said rod and said door 15 whereby the opening of said door 15 will rotate said rod, whereby said first-named door will automatically reopen, substantially as described.

2. An animal-trap, comprising a main oblong box or cage which is in communication at one end with a supplemental box, said main box or cage being provided at its outer end with a weighted drop-door which is normally held in a horizontal position, and which opens inwardly, and at its inner end with a drop-door which is normally closed and which opens into the supplemental box, and which is provided with an outwardly-directed arm, said main box or cage being also provided centrally of the bottom thereof with a pivoted table which is normally held in a horizontal position, a lever pivoted in the bottom of the main box or cage, one end of which projects beneath the free edge of said table, and the other beneath the arm of the door at the inner end of said main box or cage, and devices connected with said lever for closing the door at the outer end of the main box or cage when the pivoted table is depressed, said devices being actuated by the door at the inner end of the main box or cage so as to reopen the door at the outer end thereof, substantially as shown and described.

3. An animal-trap comprising a main oblong box or cage which is in communication at one end with a supplemental box or cage, said main oblong box or cage being provided with a weighted drop-door which is normally held in an open position and at its inner end with a drop-door which is normally closed, and which opens inwardly into the supplemental box or cage, and which is provided with an outwardly-directed arm, said main box or cage being also provided centrally of the bottom thereof with a pivoted table, and with a lever which is pivotally supported, and one end of which projects beneath the free edge of said table, and the other beneath the arm of the door at the inner end of the main box or cage, said table being also provided with a pivoted rod which passes upwardly through a suitable support, and by which the table is held in a horizontal position, and a rod pivotally connected with said lever and in operative connection with a horizontal rod by which the door at the outer end of the main box or cage is closed, said parts being constructed, combined and arranged substantially as shown and described.

In testimony that I claim the foregoing as my invention I have signed my name, in presence of the subscribing witnesses, this 7th day of September, 1897.

JOHN DAVIDSON.

Witnesses:
W. CROSS,
J. W. WALLACE.